April 21, 1942.                R. V. FERGUSON                    2,280,645
                        INTERNAL COMBUSTION ENGINE
                       Filed May 24, 1939        7 Sheets-Sheet 1

Robert V. Ferguson
            INVENTOR.
BY
            ATTORNEY.

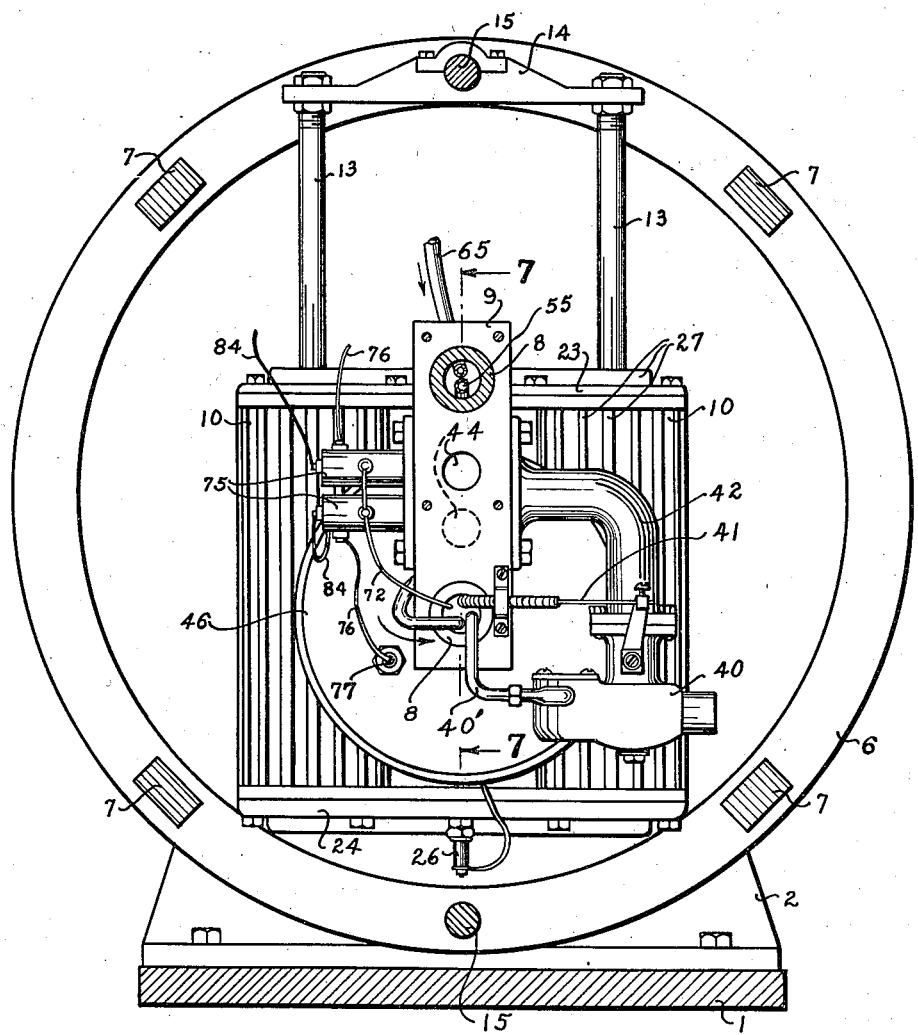

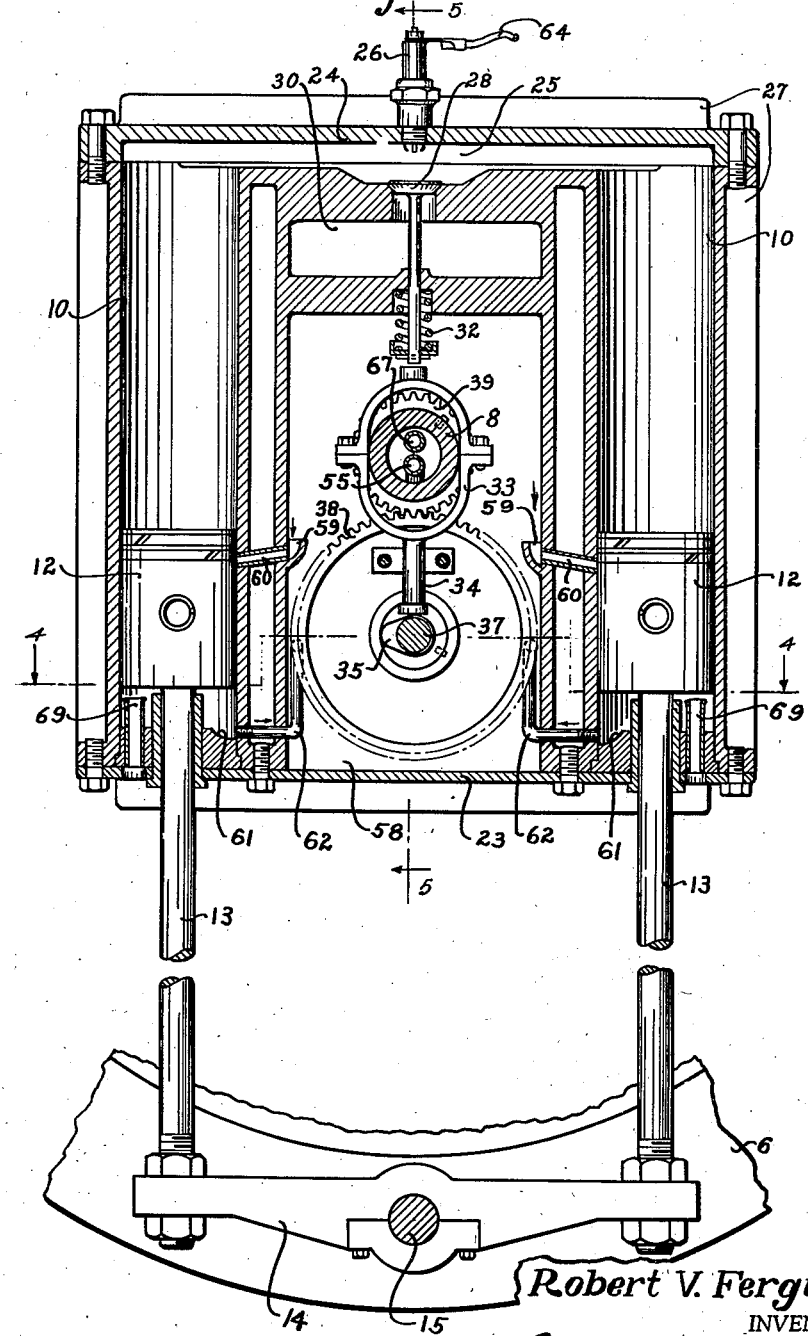

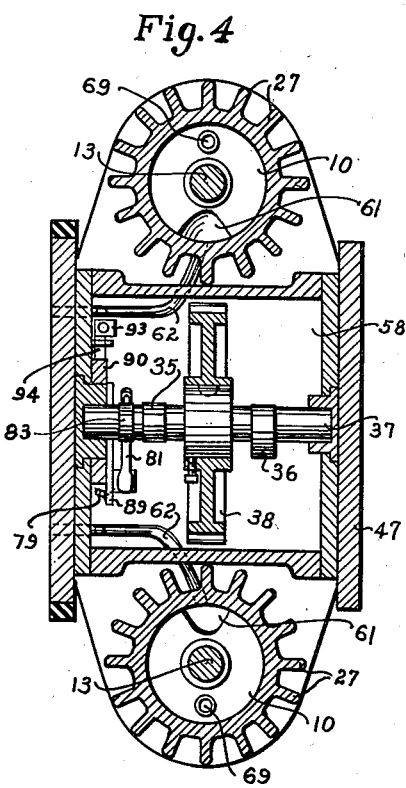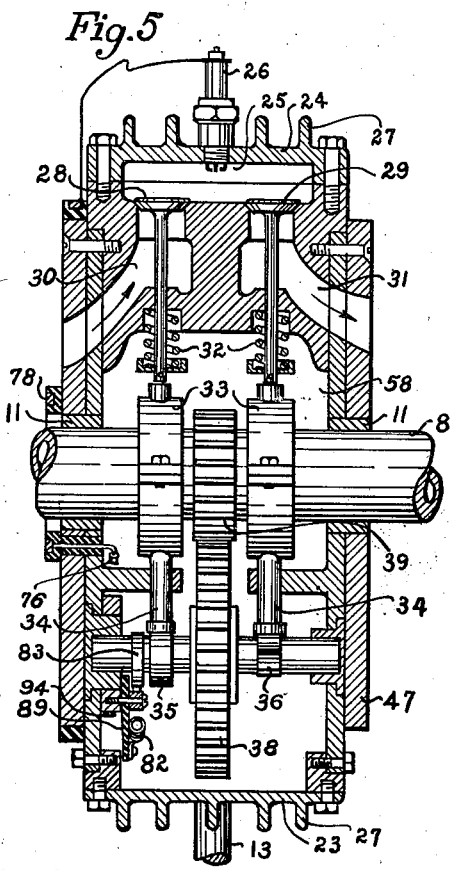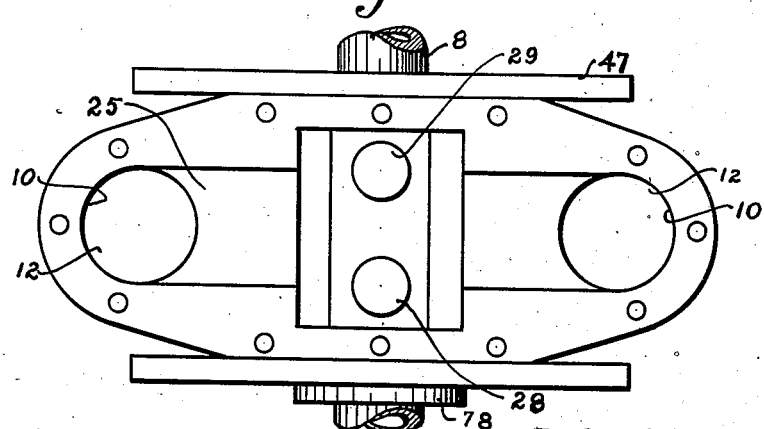

April 21, 1942.     R. V. FERGUSON     2,280,645
INTERNAL COMBUSTION ENGINE
Filed May 24, 1939     7 Sheets-Sheet 5
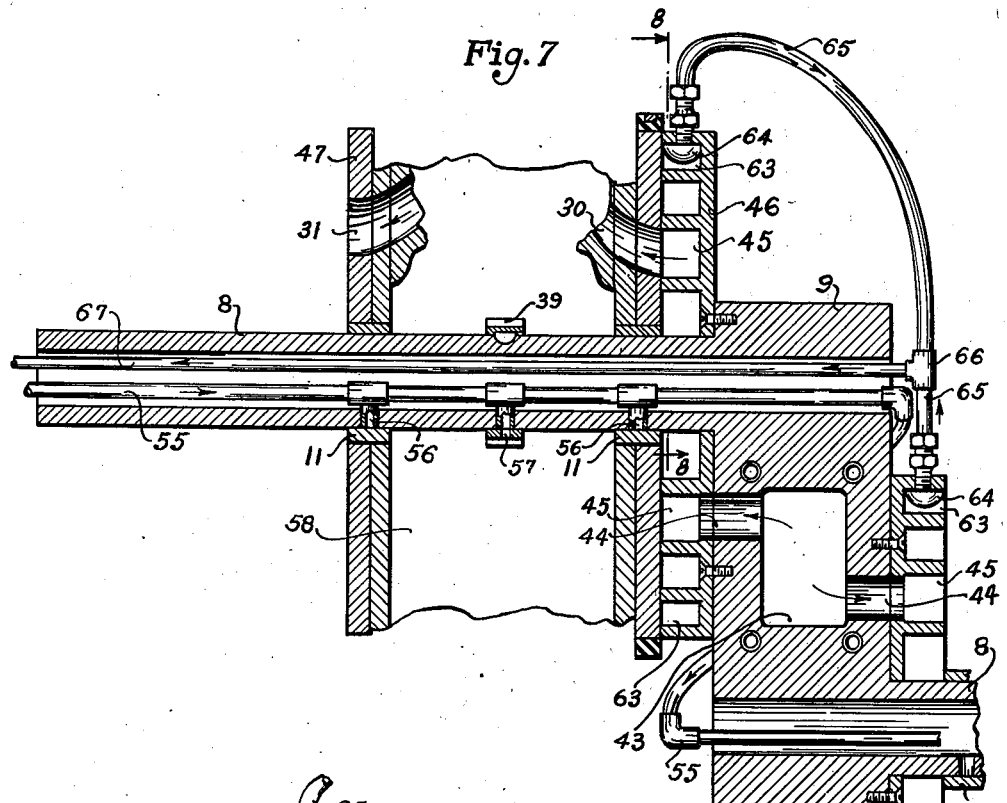
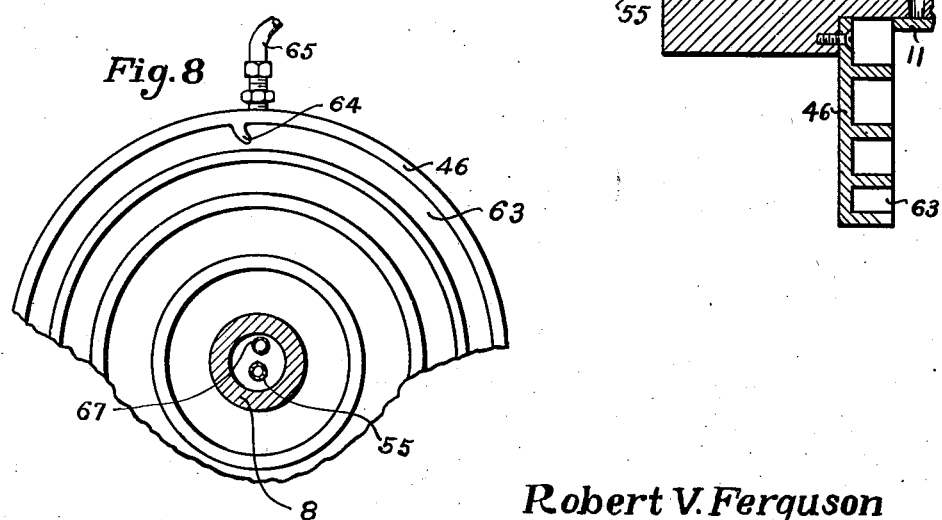
Robert V. Ferguson
INVENTOR.
BY *J. Preston Swecker*
ATTORNEY.

April 21, 1942. R. V. FERGUSON 2,280,645
INTERNAL COMBUSTION ENGINE
Filed May 24, 1939 7 Sheets-Sheet 6

Robert V. Ferguson
INVENTOR.

BY *J. Preston Swecker*
ATTORNEY.

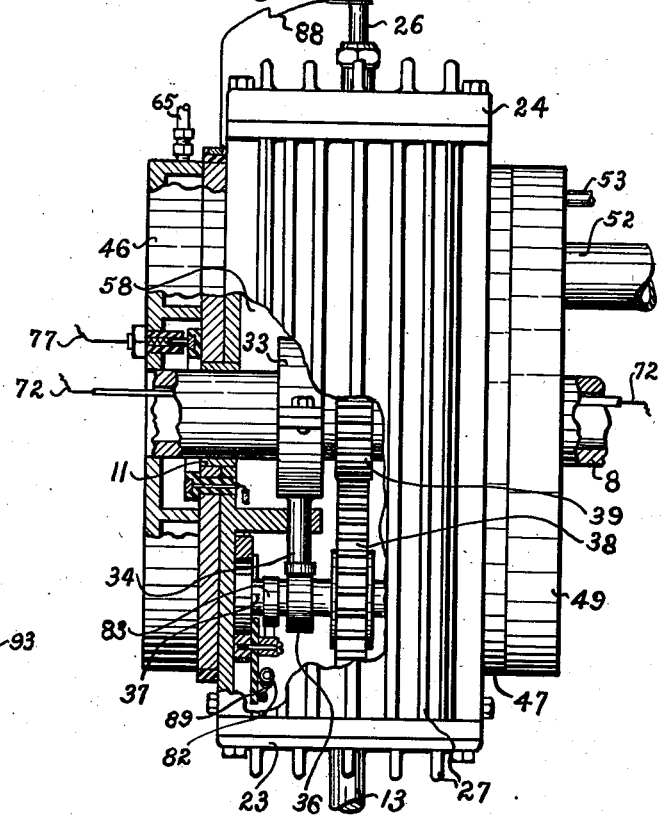
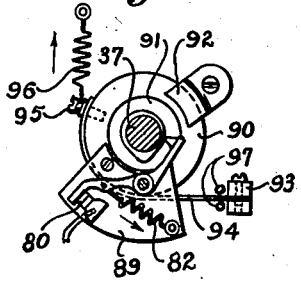
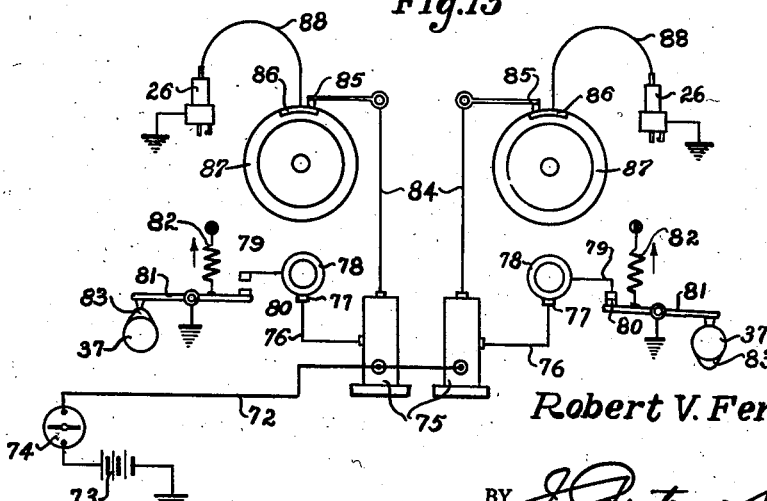
Robert V. Ferguson
INVENTOR.
ATTORNEY.

Patented Apr. 21, 1942

2,280,645

UNITED STATES PATENT OFFICE 2,280,645

INTERNAL COMBUSTION ENGINE

Robert V. Ferguson, Amarillo, Tex.

Application May 24, 1939, Serial No. 275,548

7 Claims. (Cl. 123—43)

This invention relates to an improvement in internal combustion engines, particularly of the rotary type in which the cylinders and pistons turn bodily about an axis during their relative movements.

Many attempts have been made heretofore to increase the efficiency of internal combustion engines of the type used in motor vehicles, airplanes, and as stationary engines, and various rotary motors have been proposed. However, these have not materially increased the efficiency or overcome the disadvantages in the conventional reciprocating type of internal combustion engines, and for the most part, such suggested rotary engines have been intricate in construction and not feasible in operation.

The object of this invention is to improve and simplify the construction of an internal combustion engine, to increase its efficiency, and to make it practical and capable of use for the usual internal combustion engines employed heretofore.

One cause of lack of efficiency for a reciprocating type of internal combustion engine is the necessity for the starting and stopping of the reciprocating movements of the pistons twice during each revolution of the crank shaft, which makes it necessary to build up the momentum of the pistons to a high pitch and then reduce it to zero twice for each revolution, with the consequent material loss of power. To overcome this, the present invention provides for the operation of the engine in a rotary motion and to utilize the weight of the cylinders and pistons and adjacent rotary parts to provide sufficient inertia for proper balance and fly wheel capacity. During the rotation of the engine, a relative motion is obtained between the cylinders and pistons, whereby the power generated by the explosions within the cylinders is diverted in a tangential power stroke always having a tendency to push the cylinders in a curved path, thus utilizing the greatest efficiency of the power generated, which cannot be done in the conventional type of reciprocating engine.

The construction and manner of operation of this engine makes it possible for the designer to obtain as long a stroke as desired, because the greater the offset of the stationary crank shaft, the greater the leverage will be obtained due to the explosive power of the charge in the cylinders over the fly wheel portion of the engine. Vibration is reduced to a minimum by reason of this rotary action, and momentum is utilized to increase the power. This arrangement holds the connecting rods always parallel with the cylinder walls during their operation, eliminating side thrust against the cylinder walls, which is present in a reciprocating engine, and also making it possible to obtain a longer stroke without an increased side thrust.

A preferred embodiment of the invention is shown in the accompanying drawings, in which:

Fig. 2 is a transverse vertical sectional view therethrough on the line 2—2 of Fig. 1, parts being in elevation;

Fig. 3 is a similar view on the line 3—3 of Fig. 1;

Fig. 4 is a cross sectional view through the cylinder structure on the line 4—4 of Fig. 3;

Fig. 5 is a vertical sectional view through the valve mechanism thereof, on the line 5—5 of Fig. 3;

Fig. 6 is a detailed top plan view of the cylinder structure with the head removed;

Fig. 7 is a detailed vertical section through the stationary crank shaft structure substantially on the line 7—7 of Fig. 2, with parts broken away and in section;

Fig. 8 is a fragmentary sectional view through the intake manifold on the line 8—8 of Fig. 7;

Fig. 13 is a side elevation of the cylinder structure with parts broken away and in section to show the electrical contact mechanism;

Fig. 14 is a detailed side elevation, partly in section, of the breaker point and automatic spark control unit; and Fig. 15 is a diagrammatic view of the ignition system of the engine.

Figure 1:
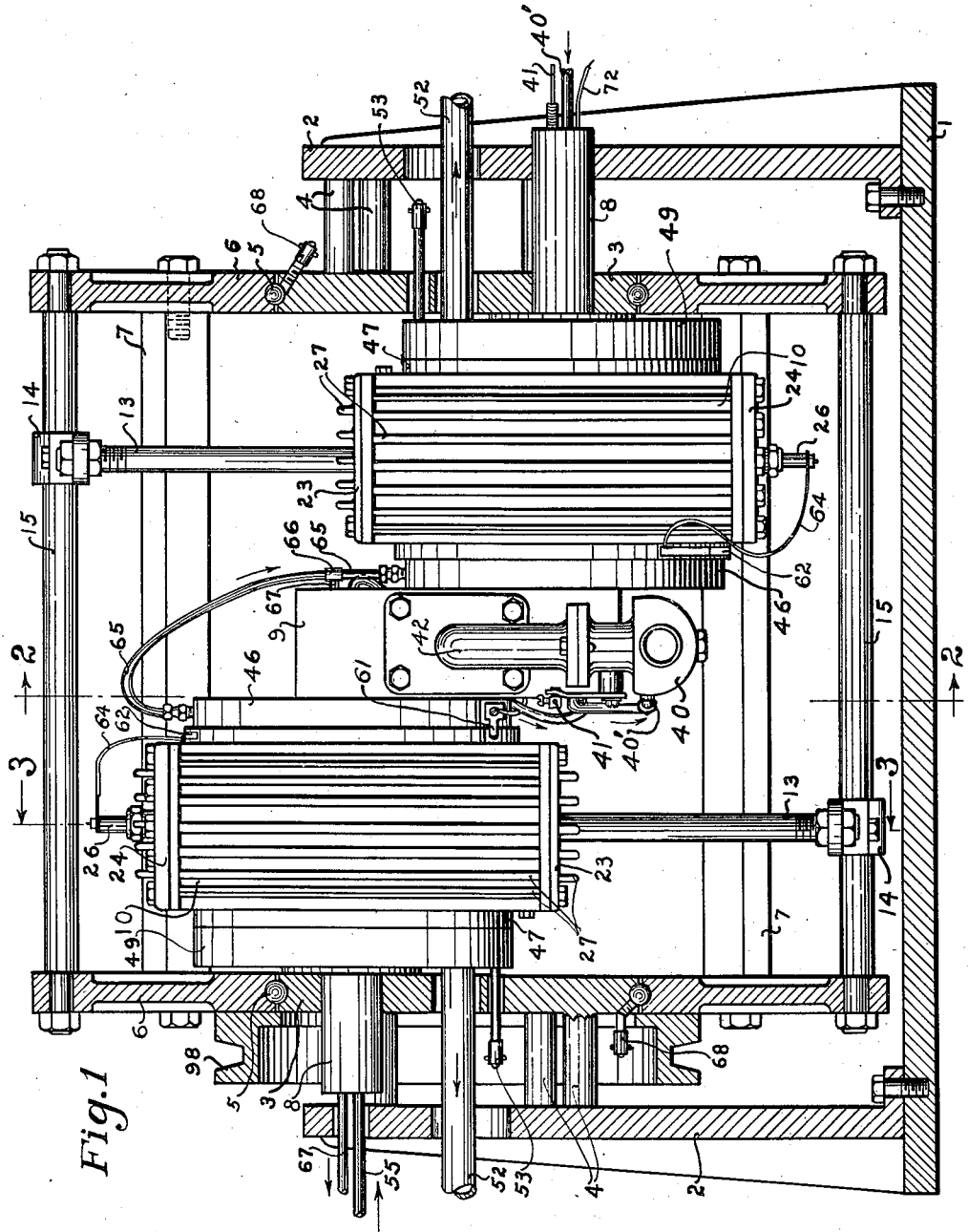
Fig. 1 is a longitudinal sectional view through the engine, with the cylinders and associated parts in elevation.

As shown in Figs. 1 and 2 of the drawings, the engine structure is mounted on a base plate 1, to the opposite ends of which are secured upstanding pedestals 2 in longitudinally spaced relation. Stationary end plates 3 are secured to the respective pedestals 2 by spacing supports 4 extending therebetween, and which securely support the operating parts of the engine.

Journaled on bearings 5 surrounding the end plates 3 are rims 6 adapted to rotate thereon, and which rims 6 are connected together through longitudinal braces 7 extending therebetween.

Rigidly mounted in the end plates 3, eccentrically thereof, are end portions 8 of a crank shaft, which end portions are laterally offset at their inner ends on opposite sides of the center of the end plates 3, and have their inner ends connected together by an offset portion 9, as shown in Fig. 7. The crank shaft portions 8 are hollow for a purpose hereinafter described, and the offset portion 9 is integral therewith.

The cylinders of the engine are designated generally by the numeral 10 and are shown in Figs. 1 and 2, as arranged in two pairs at the respective opposite ends of the engine. Each pair of cylinders is rigidly connected together or integral, and is journaled on bearings 11 (Fig. 7) on the crank shaft end portion 8, so as to rotate bodily therearound.

As shown in Fig. 3, the cylinders 10 have pistons 12 operatively mounted therein, which pistons have attached connecting rods 13 extending therefrom to opposite ends of a yoke 14 journaled intermediate its ends on a rod 15 extending between the rotary rims 6. The separate pairs of cylinders at the respective ends of the engine are located substantially on opposite sides of the center axis of the engine, and the rods 15 therefor are arranged on diametrically opposite sides of the rotary rims 6, as shown in Figs. 1 and 2.

Figure 11:
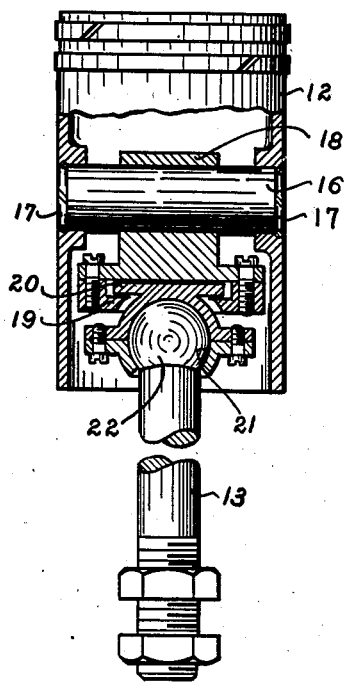
Fig. 11 is a side elevation partly in section of the piston and connecting rod detached.
Figure 12:
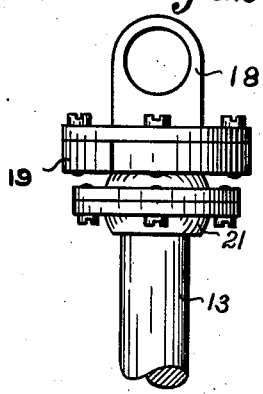
Fig. 12 is a side elevation of the connecting rod head structure detached.

The connection between the piston 12 and its connecting rod 13 is shown in detail in Figs. 11 and 12. Due to the inaccuracy in machining and to the wear which results from operation over a long period of time, it is desirable to have the piston free to turn in any direction and automatically adjustable to any lateral extent. For this purpose, the piston 12 is shown as provided with a wrist pin 16 slidably received in opposite sides thereof and held in place by spring clip rings 17. The wrist pin 16 slidably receives a mounting 18 thereon which is free to slide longitudinally of the wrist pin and to rotate therearound to a limited degree. The mounting 18 has a coupling 19 detachably secured to the underside thereof and is split transversely to embrace and enclose a disc 20 attached to a socket 21 enclosing a ball 22 on the upper end of the connecting rod 13. This structure allows limited relative movement in all directions between the piston and its connecting rod, whereby the piston is free to float in any direction in the cylinder without binding engagement with the connecting rod and it will not bind or score the cylinder because of misalignment.

The cylinders 10 are shown in Fig. 3 as closed at their lower ends by a cover plate 23 while their upper or outer ends are closed by a head 24, which has an explosion chamber 25 therein communicating at its opposite ends with the cylinders 10. The head 24 also carries a spark plug 26, extending into the explosion chamber 25 approximately midway between the cylinders 10, as shown, or additional spark plugs may be provided for the respective cylinders, if desired.

The head 24, the cylinders 10, and the closure plate 23, are shown as being air-cooled, being provided with the usual radiating fins 27 for this purpose.

As shown in Fig. 5, gaseous fuel is supplied to and exhaust gases are discharged from the combustion chamber 25 and through the same from the cylinders, at points approximately midway between the cylinders 10 under control of intake and exhaust valves 28 and 29, which control communication of intake and exhaust passageways 30 and 31, respectively, with the combustion chamber 25. The valves 28 and 29 are pressed toward seated positions by the tension of springs 32 sleeved on the valve stems. The lower ends of the valve stems are aligned with yoke shaped tappet members 33, having depending points 34 in alignment with cams 35 and 36 for the respective intake and exhaust valves, and which cams are set at angles to each other to actuate the valves alternately, being mounted on a shaft 37, journaled in opposite sides of the cylinder structure. The shaft 37 is rotated by a gear 38 thereon meshing with a pinion 39 fixed to the stationary crank shaft portion 8. Thus, when the cylinders turn bodily about the crank shaft portion, the planetary movement of the gear 38 around the stationary pinion 39 will cause rotation of the cam shaft 37 to operate the cams 35 and 36, and transmit such motion through the points 34 and tappet members 33 to unseat the valves alternately for admitting charges to the explosion chamber 25 and for discharging the spent gases therefrom.

It will be evident that the mounting of the cylinders with their longitudinal centers substantially on opposite sides of the crank shaft portions 8 eccentrically of the end plates 3, will cause these cylinders to remain in the same relation to the respective axes of the crank shaft portions 8, but to turn therearound upon rotation of the rims 6 with which the connecting rods 13 are attached. This will cause relative rectilinear movement between the cylinders and pistons during such rotation of the rims 6 which rotate about the centers of the end plates 3. During this rotary movement, the pistons and their connecting rods remain in the same parallel position and side by side relation, the relative movements being the same in both cylinders of each pair. During this bodily turning movement of the cylinders, the gear 38 will be rotated as described above, first to open the intake valve 28 to draw in a charge of combustion fuel into the combustion chamber 25, after which the valve 28 will be closed, the charge compressed in the usual way by the pistons 12 which simultaneously approach the outer ends of the cylinders, and at the desired point and time, the spark plug 26 will be energized to ignite the combustible gas within the explosion chamber 25 communicating with the cylinders. This will cause relative separating movement between the cylinders and pistons which will be equal in both cylinders due to the parallel motion of the pistons and their connection together through the yoke 14. Since the rims 6 are rotating during this relative movement between the pistons and cylinders, the force of the explosion will be transmitted to the rims tending to increase the turning motion thereof and apply power thereto. Due to the differences in distance between the centers of the end plates 3 and the axes of the crank shaft portions 8, this will cause relative motion between the pistons and cylinders equal to double this distance between the centers, whereby substantial relative movement between the parts may be obtained.

After the explosion has occurred, the cam 36 is arranged in proper position to open the exhaust valve 29 permitting the escape of the exhaust gases through the passageway 31 into the exhaust manifold, hereinafter described.

The form of engine shown in the drawings is of the four-cycle type. However, it will be understood that it may be readily modified to operate on a two-cycle principle, if desired.

For supplying fuel to the intake passageway 30, a carburetor 40 is connected with one side of the crank shaft connecting portion 9, which carburetor may be of conventional construction capable of vaporizing fuel for supply to the cylinders. It is shown as controlled through a flexible wire 41 attached to the butterfly lever of the carburetor and extending through one of the end portions 8 of the crank shaft, as shown in Figs. 1 and 2. Fuel is fed to the carburetor through tube 40' extending through an end portion 8 as shown in Fig. 1.

The carburetor 40 has a conduit 42 extending therefrom to the crank shaft portion 9 and communicating with the passageway 43 therein. The passageway 43 has lateral openings 44 in opposite sides thereof, as shown in Fig. 7, each of which lateral openings is in open communication with an annular passageway 45 in a manifold 46 secured to one side of the connecting crank shaft portion 9 between the same and the adjacent side of the cylinder structure. The opposite side of the passageway 45 from the lateral opening 44 is in open communication with the intake passageway 30 leading to the intake valve 28 between the cylinders.

Figure 9:
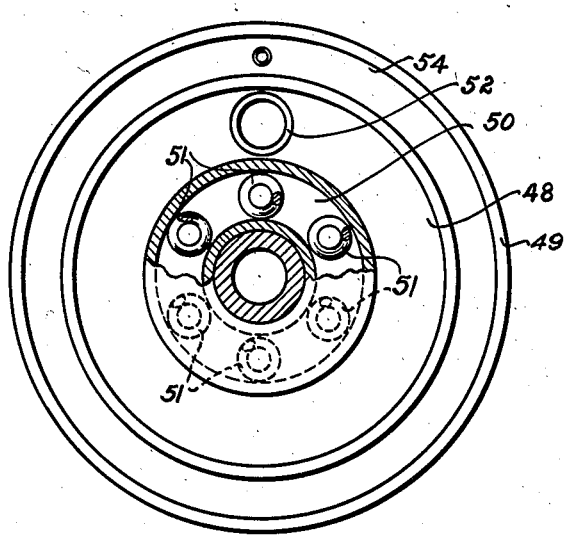
Fig. 9 is a similar view of the exhaust manifold structure with parts broken away and in section.
Figure 10:
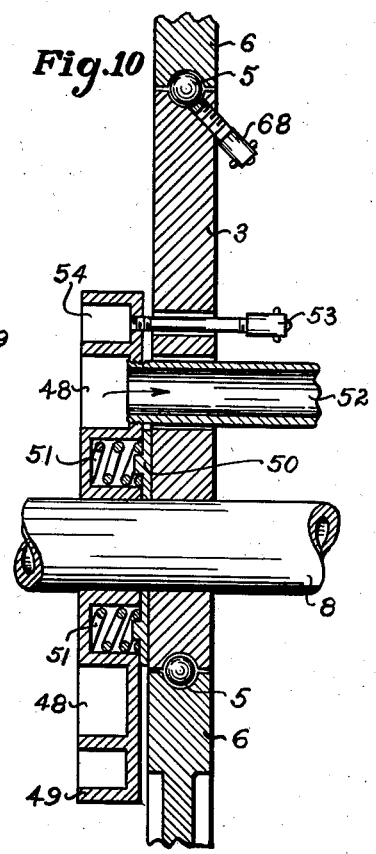
Fig. 10 is a vertical sectional view therethrough

On the opposite side of the pair of cylinders from the intake manifold 46 is secured to the cylinders for turning movement therewith, a disc 47 having an opening therein which registers with the exhaust passageway 31 and which opening also registers with an annular passageway 48 in an exhaust manifold 49 (Figs. 9 and 10). The exhaust manifold 49 is held stationary, being secured to and supported by the adjacent end plate 3 by a disc 50 secured thereto, and having springs 51 interposed between said disc and the manifold 49 tending to press said manifold against the rotatable disc 47 to maintain a tight connection therebetween for the proper discharge of the exhaust gases. An exhaust pipe 52 is connected with the manifold 49 within the annular passageway 48. The exhaust manifold 49 also has secured thereto a lubricating fitting 53 to introduce lubricant into an annular passageway 54 in the manifold to reduce the friction between the disc 47 and said manifold and for free rotation of the former relative thereto without the escape of exhaust gases therebetween.

Lubricant is supplied to the operating parts of the engine through an inlet pipe 55 (Fig. 7) which passes into the engine through crank shaft end portion 8 at the left in Fig. 1 and has oil outlets 56, leading to the bearings 11 of the cylinder blocks, and an oil outlet 57, opening through the pinion 39 to lubricate the timing gears 38—39. As shown in Fig. 7, the pipe 55 extends through the opening of the left hand crank shaft portion 8 and connecting portion 9, around the latter and into the open end of the other crank shaft portion 8 with connections to lubricate similar parts therein. As the oil leaks out of the various bearings and into the interior of the valve tappet chamber 58 (Fig. 5), it will be thrown outward to the side walls thereof, as shown in Fig. 3, due to the turning movement of the cylinders and the centrifugal force thereof, where it will be caught in pockets 59 and directed through pipes 60, extending inwardly from said pockets to the side walls of the cylinders 10 for supplying lubricant thereto and to the pistons 12. Any oil that finds its way to the inner ends of the cylinders will be caught in recesses 61 at said inner ends and will be discharged through tubes 62 by centrifugal force, which tubes extend into communication with an annular oil circulating groove 63 in the manifold 46. The groove 63 has a projection 64 (Figs. 7 and 8) located therein in position to direct the oil from said groove 63 into an oil return pipe 65 which leads therefrom and is connected with a similar pipe of the opposite manifold at a coupling 66. A discharge pipe 67 is connected with the coupling 66 for the discharge of the oil therefrom, back to the point of supply or other desired place.

Provision may be made also for lubricating any other bearings of the engine, such as the bearings 5, by the usual lubricant fittings as shown at 68.

The inner ends of the cylinders 10 are closed to permit the discharge of lubricating oil therefrom, as described, but breather pipes 69 are provided in the lower portions of the cylinders as shown in Fig. 3, to permit the intake and exhaust of air beneath the pistons. These breather pipes project into the lower portion of the cylinders a sufficient distance so that the oil will not flow out through the openings, and yet they do not interfere with the proper operations of the pistons.

The ignition system is shown generally in Fig. 15, which consists of an electric circuit 72 leading from one side of a source of electrical supply, such as a storage battery 73, the opposite side of which is shown as grounded in the usual way, and which circuit is controlled by a switch 74. The circuit wire 72 extends through the hollow crank shaft 8 to a pair of spark coils 75, one for each pair of cylinders which spark coils are shown in Fig. 2, as mounted on a side of the crank shaft connecting portion 9 for support thereby between the pairs of cylinders. A wire 76 leads from the primary of each spark coil 75 to a brush 77 bearing against an insulated slip ring 78, from which ring 78 a wire 79 extends to the stationary one of a pair of breaker points 80. These breaker points are mounted within the tappet chamber 58, and the movable point is carried by a lever 81 pressed by a spring 82 against a cam 83 mounted on cam shaft 37. The cams 83 for the opposite pairs of cylinders are arranged 180° apart so as to operate the breaker points alternately in the present construction, and which operates at one-half the speed of turning movement of the cylinders about the crank shaft.

As the flow of current through the wire 76 from the primary of the spark coil 16 is interrupted by the separation of the breaker points at intervals, it will excite the secondary winding of the spark coil and cause high tension current to flow through a circuit 84 to a brush 85 which is timed then to be in contact with a metallic segment 86 on an insulated ring 87 attached to a side of the cylinder casing for rotation therewith. A wire 88 leads from the segment 86 to the spark plug 26 of the pair of cylinders, in properly timed relation to ignite the charge of fuel therein, as described above.

The breaker points 80 and lever 81 are mounted on an insulating plate 89 to which one end of the spring 82 is connected. The plate 89 is attached to a disc 90 which is free to rotate about its bearing 91 around the cam shaft 37. A retaining clip 92 holds the disc 90 against axial movement while permitting of such turning movement under the influence of a weight 93. This weight 93 is attached to a semi-flexible band 94, the opposite end of which is attached to the disc 90 by a screw 95. A spring 96 is also connected with the screw 95 tending to return the disc 90 to its initial position in opposition to the weight 93.

As the speed of turning movement of the cylinders increases, the centrifugal force thereof will act to throw the weight 93 outward between guides 97, thus shifting the positions of the breaker points 80 and lever 81 relative to the cam 83, in such manner as to cause a breaking of the circuit earlier as the speed of the engine increases due to the action of the weight 93. As the speed of turning movement of the cylinders decreases, the spring 96 will retract the disc 90 and breaker points to retard the spark.

As the engine operates as described above, the rotary rims 6 constitutes a fly wheel that is driven by the relative motion between the pistons and cylinders under the power of the explosion therein. This power may be transmitted to any desired point, for which purpose one of the rims 6 is shown as provided with a pulley 98 thereon (Fig. 1).

I claim:

1. In an internal combustion engine, the combination of a fly wheel structure and crank shaft eccentrically mounted relative to each other for relative rotary movement, a pair of cylinders arranged side by side on opposite sides of a plane extending lengthwise of the crank shaft between the cylinders and rigidly connected together, and pistons mounted in said cylinders, said pistons and cylinders being operatively connected between the crank shaft and fly wheel structure, the cylinders having combustion chambers therein located substantially on the same side of a plane extending lengthwise of the crankshaft at right angles to the first-mentioned plane and on the opposite side of the second-mentioned plane from the connections with the fly wheel structure, and means for causing approximately simultaneous explosions in the combustion chambers of said pair of cylinders.

2. In an internal combustion engine, the combination of a fly wheel structure and crank shaft eccentrically mounted relative to each other for relative rotary movement, a pair of cylinders arranged in parallel relation on opposite sides of a plane extending lengthwise of the crank shaft between the cylinders and rigidly connected together, and pistons operatively mounted in said cylinders, said pistons and cylinders being operatively connected together between the fly wheel structure and crank shaft for relative movement and for pivotal connection respectively with said fly wheel structure and crank shaft, the cylinders having combustion chambers therein located substantially on the same side of a plane extending lengthwise of the crankshaft at right angles to the first-mentioned plane and on the opposite side of the second-mentioned plane from the connections with the fly wheel structure, and means for causing approximately simultaneous explosions in the combustion chambers of said pair of cylinders.

3. In an internal combustion engine, the combination of a fly wheel structure and crank shaft eccentrically mounted relative to each other for relative rotary movement, a pair of cylinders arranged in parallel side by side relation on opposite sides of a plane extending lengthwise of the crank shaft between the cylinders and permanently connected together, means mounting said cylinders on the crank shaft for pivotal motion relative thereto, pistons operatively mounted in the cylinders for movement relative thereto, and means pivotally connecting the pistons with the fly wheel structure, the cylinders having combustion chambers therein located substantially on the same side of a plane extending lengthwise of the crankshaft at right angles to the first-mentioned plane and on the opposite side of the second-mentioned plane from the connections with the fly wheel structure, and means for causing approximately simultaneous explosions in the combustion chambers of said pair of cylinders.

4. In an internal combustion engine, the combination of a fly wheel structure and crank shaft eccentrically mounted relative to each other for relative rotary movement, a pair of cylinders arranged in parallel side by side relation on opposite sides of a plane extending lengthwise of the crank shaft between the cylinders and permanently connected together, means mounting said cylinders on the crank shaft for pivotal motion relative thereto, pistons operatively mounted in the cylinders for movement relative thereto, means pivotally connecting the pistons with the fly wheel structure, and means for controlling the intake of combustible fuel to the cylinders jointly and for controlling the exhaust of gases therefrom, the cylinders having combustion chambers therein located substantially on the same side of a plane extending lengthwise of the crankshaft at right angles to the first-mentioned plane and on the opposite side of the second-mentioned plane from the connections with the fly wheel structure, and means for causing approximately simultaneous explosions in the combustion chambers of said pair of cylinders.

5. In an internal combustion engine, the combination of a fly wheel structure having spaced rims connected together, a crank shaft mounted between the rims, a pair of parallel cylinders journaled on the crank shaft for turning movement relative thereto and arranged on opposite sides thereof, means for permanently connecting said cylinders together in side by side parallel relation and for joint turning movement about the crank shaft and relative to the rims, pistons operatively mounted in the cylinders, means for rigidly connecting the pistons together and jointly pivoting the same to the fly wheel structure for joint action thereon, and means for controlling the admission of combustible fuel jointly and simultaneously to the parallel cylinders, and for controlling the exhaust of gas therefrom.

6. In an internal combustion engine, the combination of spaced rims, end plates supporting the rims for rotary movement relative thereof, means connecting the rims rigidly together for joint turning movement, a stationary crank shaft rigidly mounted in the end plates eccentrically of the rims, said crank shaft having laterally offset end portions arranged out of alignment with each other, pairs of cylinders journaled respectively on the offset end portions of the crank shaft for bodily turning movement relative thereto, each pair of cylinders having the cylinders arranged on opposite sides of the crank shaft end portions and rigidly secured together in parallel relation, pistons in the cylinders, and means for connecting the pistons of each pair together and jointly with the rims with the pistons of one pair arranged to act substantially in the opposite direction from the pistons of the other pair.

7. In an internal combustion engine, the combination of a rotary fly-wheel structure having spaced end rims, tie rods rigidly connecting said end rims together, a crank-shaft mounted in the fly-wheel structure, a pair of cylinders arranged in parallel relation on opposite sides of the crank-shaft and rigidly connected together, pistons operatively mounted in the cylinders, connecting rods secured to the pistons and extending outwardly therefrom, a yoke rigidly securing the connecting rods together, and means pivotally connecting said yoke with one of the tie rods, said pair of cylinders having the major portions thereof disposed on the opposite side of the axis of the fly-wheel structure from said connected tie-rod with the connecting rods extending in an outward direction from the cylinders to the yoke.

ROBERT V. FERGUSON.